United States Patent [19]
Scruggs

[11] Patent Number: 5,230,129
[45] Date of Patent: Jul. 27, 1993

[54] SAFETY CABLE TOOL

[75] Inventor: Michael G. Scruggs, Orlando, Fla.

[73] Assignee: Daniels Manufacturing Corporation, Orlando, Fla.

[21] Appl. No.: 831,186

[22] Filed: Feb. 5, 1992

[51] Int. Cl.[5] .................................... B23P 19/00
[52] U.S. Cl. ................................ 29/267; 29/282; 140/123.6
[58] Field of Search .............. 29/243.56, 267, 282; 140/52, 57, 93 A, 93.2, 93.4, 123.5, 123.6, 150, 152

[56] References Cited

U.S. PATENT DOCUMENTS

| | | | |
|---|---|---|---|
| 3,391,440 | 7/1968 | Harms | 140/123.6 |
| 4,047,545 | 9/1977 | Paradis | 140/93.2 |
| 4,289,175 | 9/1981 | Crittenden et al. | 140/123.6 |
| 4,930,548 | 6/1990 | Turek et al. | 140/150 |
| 5,052,094 | 10/1991 | Plasse et al. | 29/252 |
| 5,116,178 | 5/1992 | Lerman et al. | 411/87 |
| 5,127,144 | 7/1992 | Plasse et al. | 29/252 |
| 5,167,059 | 12/1992 | Plasse et al. | 29/433 |

*Primary Examiner*—Lowell A. Larson
*Attorney, Agent, or Firm*—James H. Beusse

[57] ABSTRACT

A tool for tensioning safety cable to a predetermined tension limit and for automatically terminating the cable when the cable has been tensioned to the predetermined limit. The tool includes apparatus for grasping and pulling the cable to the predetermined tension limit and apparatus for automatically crimping a ferrule onto the cable when the predetermined tension limit is reached. The crimping apparatus is operative to sever a free end of the cable concurrently with crimping of the ferrule.

9 Claims, 5 Drawing Sheets

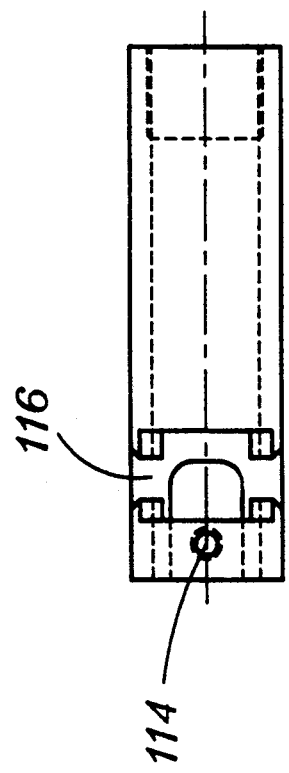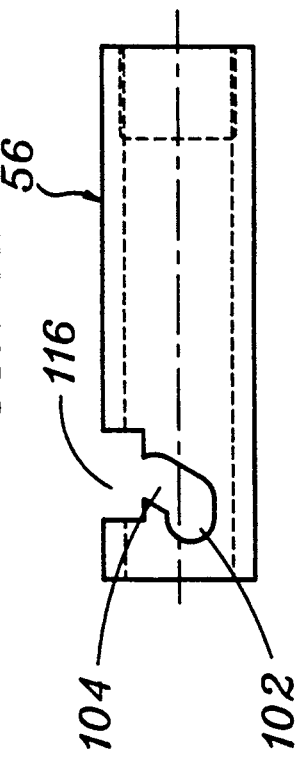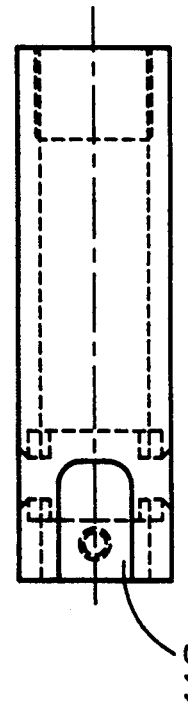

SAFETY CABLE TOOL

The present invention relates to apparatus for attaching safety cables to releasable fasteners and, more particularly, to apparatus for tensioning locking and terminating safety cables.

Various types of machinery are subject to vibration which can loosen nuts and bolts. Safety wire has long been used as protection to resist such loosening. In such use, safety wire secures two or more parts together so that loosening of one part is counteracted by tightening of the wire. Typically, a single wire is passed through an aperture in a nut or bolt, the free ends twisted together up to another part, one of the ends inserted through an aperture in the another part and the ends again twisted. The standards for utilization of safety wire are critical and are set forth in Aerospace Standard AS567, entitled "General Practices for the Use of Lockwire, Key Washers and Cotter Pins," available from the Society of Automotive Engineers, Inc., 400 Commonwealth Dr., Warrendale, Pa.

Safety wire or lockwire, as it is sometimes known, has several known problems. More recently, there has been developed an improved locking system using safety cable. Safety cable is a stranded cable having a termination on one end allowing the cable to be pulled to a predetermined tension through the aforementioned apertures in nuts and bolts. After tensioning, the free end of the cable must be terminated to hold the tension and cleanly severed to minimize any possibility of snags on loose wires. According, it is desirable to provide a tool which can affect such tensioning, terminating and severing.

SUMMARY OF THE INVENTION

A tool for tensioning safety cable to a predetermined tension limit and for automatically terminating the cable when the cable has been tensioned to the predetermined limit includes means for grasping and pulling the cable to the predetermined tension limit and means for automatically crimping a ferrule onto the cable when the predetermined tension limit is reached. The crimping means is also operative to sever a free end of the cable concurrently with crimping of the ferrule. More particularly, the tool comprises shuttle means reciprocally mounted to the tool for incrementally advancing the cable during a drive stroke and a toggle assembly operatively connected to the shuttle means for affecting reciprocal motion of the shuttle means. Tension setting means is operatively coupled to the toggle assembly for inhibiting advancement of the cable when tension is greater than a preselected value. The tool also includes clamping means operative in response to inhibited advancement of the cable for terminating the cable. The clamping means may be a ferrule held in the tool and a plunger assembly operative to compress the ferrule when the preselected tension is reached. In one form, the plunger assembly pushes the ferrule in a shearing action adjacent an aperture through which the cable extends so as to simultaneously shear the cable.

BRIEF DESCRIPTION OF THE DRAWINGS

For a better understanding of the present invention, reference may be had to the following detailed description taken in conjunction with the accompanying drawings in which:

FIG. 4 is an elevation new of an inner housing of the tool of FIG. 1;

FIGS. 6A and 6B are top and bottom views, respectively, of the housing of FIG. 4.

DETAILED DESCRIPTION

Figure 1:
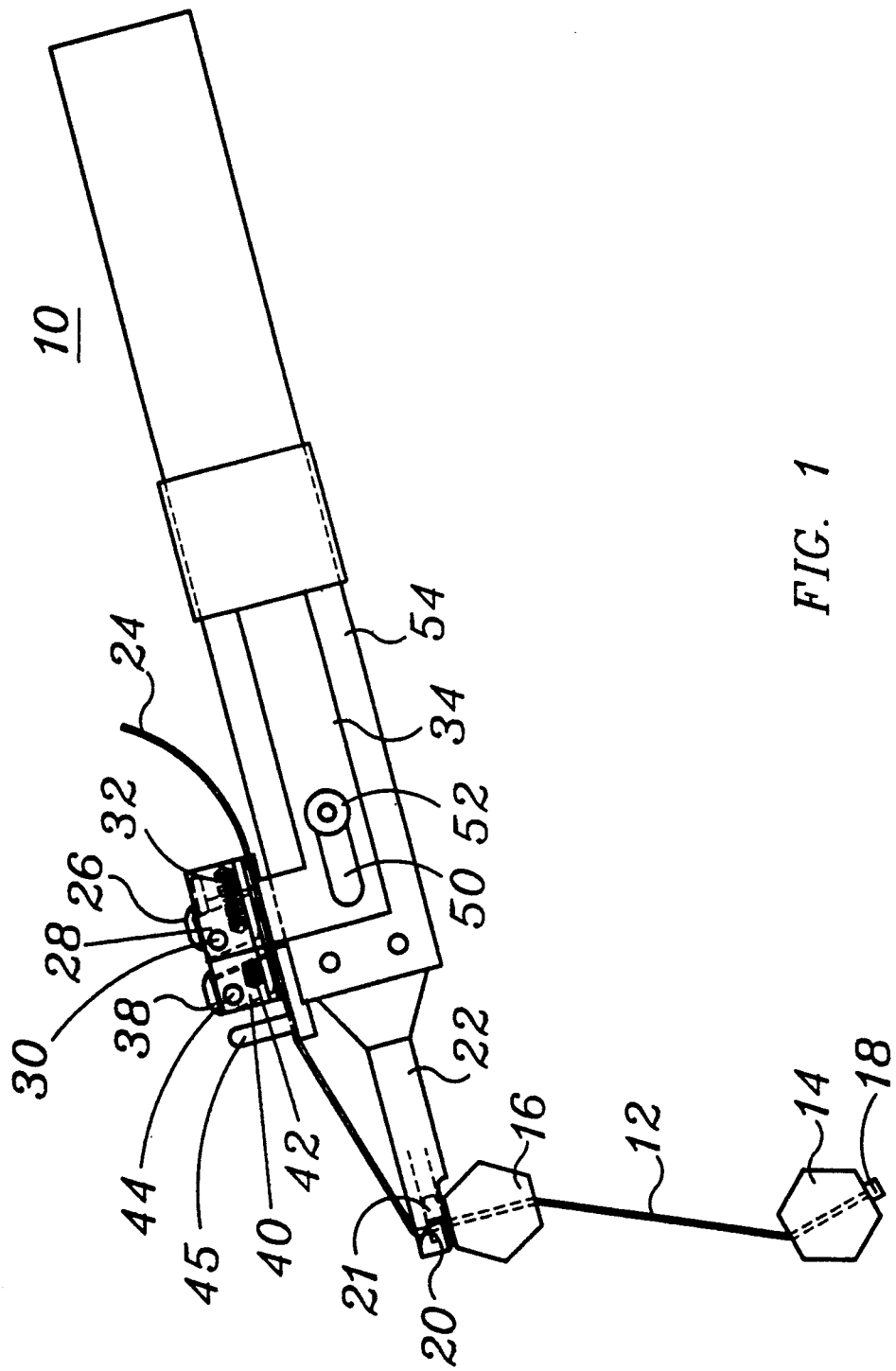
FIG. 1 is a top planar new of a tool according to the present invention.
Figure 2:
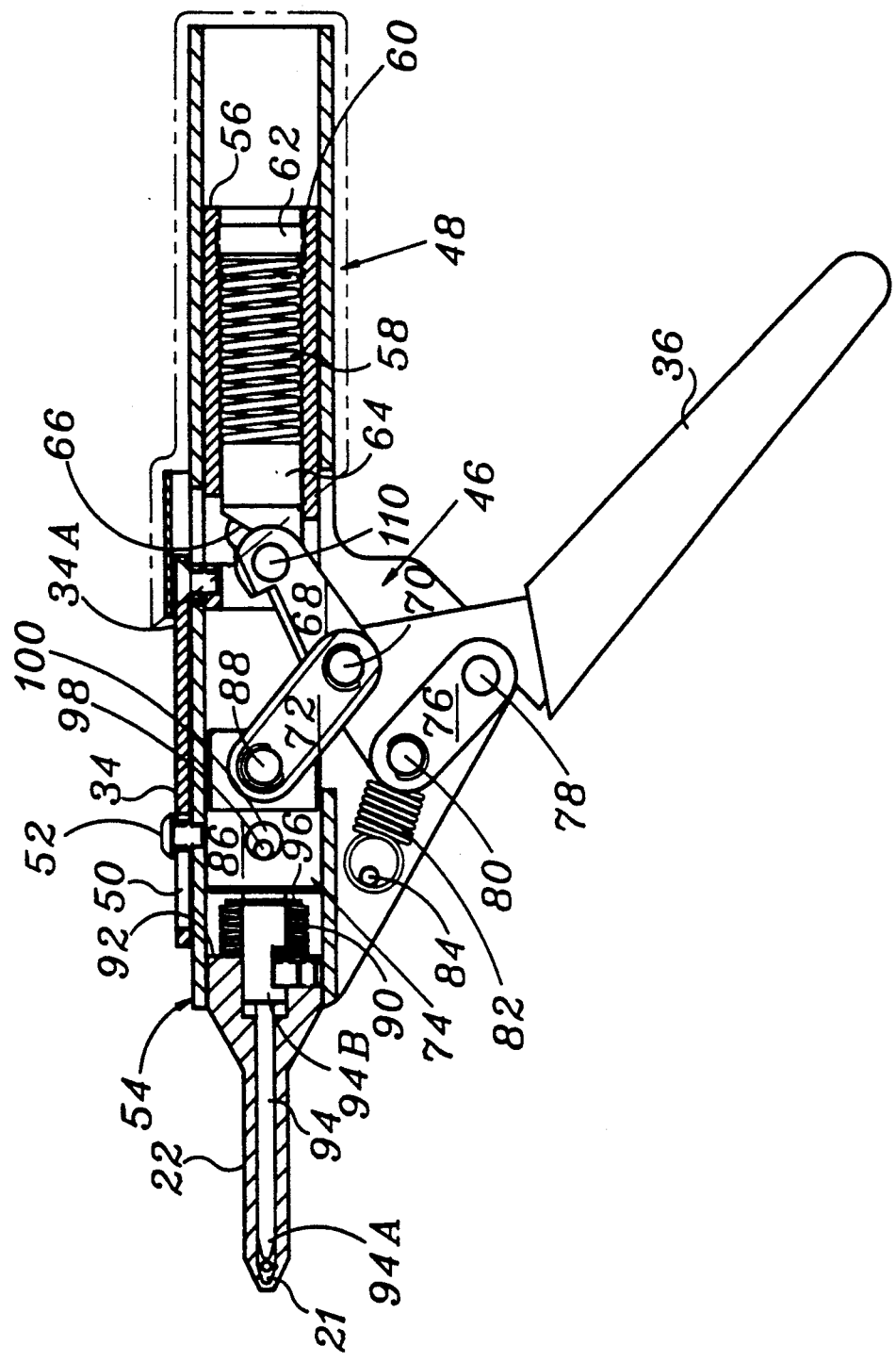
FIG. 2 is a cross-sectional side view of the tool of FIG. 1.

Referring to the Figures in generally and in particular to FIGS. 1 and 2, there is illustrated a top view and a cross-sectional side view of a safety cable tool 10 in accordance with the present invention. FIG. 1 includes a safety cable 12 passing through apertures in each of the bolt heads 14 and 16. A ferrule 18 is clamped at one end of cable 12 to prevent it from being pulled through the bolt apertures. A second ferrule 20 is seated in an aperture 21 in the nosepiece 22 of tool 10 in a position to be crimped onto cable 12 when a predetermined tension has been pulled on cable 12 by tool 10. The free end 24 of cable 12 is coupled to a shuttle assembly Which includes a first clamping means 26 for grasping and pulling the cable end 24 in a direction to tension the cable. To this end, the means 26 includes a spring loaded, pivotable pawl 28 operable about a pin 30 to grasp the cable when the means 26 pulls the cable. A spring 32 urges the pawl 28 in a direction to grasp the cable. The means 26 is connected to a reciprocable arm 34 which pulls the means 26 in a direction to tension cable 12 when lever 36 (FIG. 2) is depressed.

When lever 36 is released, the arm 34 moves toward a second clamping means 38. During this latter movement, the pawl 28 pivots about pin 30 to release cable 12 and allow the means 26 to move without moving cable 12. The second clamping means 38 is fixed to tool 10 and includes a spring loaded, pivotable pawl 40 which grasps cable 12 and prevents the cable from moving in a direction to release tension on the cable when means 26 is released. A spring 42 urges pawl 40 about a pin 44 in a direction to tighten on cable 12. Both means 26 and means 38 are substantially identical and allow cable 12 to be pulled only in a direction to increase tension in the cable. A post 45 provides a fulcrum for supporting cable end 24 to facilitate pulling into clamping means 26 and 38.

The tool 10 includes a toggle assembly and a tension setting means indicated generally at 46 and 48, respectively, which cooperate to advance cable 12 through the shuttle assembly until the predetermined tension has been pulled on cable 12. The reciprocal arm 34 includes a slot 50 through which a pin 52 passes in order to hold arm 34 in sliding engagement with a top outer surface of a first or tool housing 54. An end 34A of arm 34 is attached to a second or inner housing 56 slidingly positioned within an aft portion of tool housing 54.

The tension setting means 48 comprises a spring 58, which may be a coil spring, positioned within housing 56. At least a portion of housing 56 is threaded, as shown at 60, so that a threaded plug 62 can be inserted to form an adjustable seat for spring 58. The plug 62 can be positioned to vary the compression of spring 58 to control the tension to be pulled in cable 12. The end of spring 58 opposite plug 62 abuts against a push rod 64 having a forward facing inclined surface 66. The spring 58, plug 62 and rod 64 comprise, with inner housing 56, the tension setting means for controlling tension in cable 12. The arm 34 in combination with the housing 56 and tension setting means comprise an actuator means operable with the toggle assembly to pull tension on the cable 12 when the tension is less than the predetermined limit set by spring 58 and plug 62.

The lever 36 is coupled to inner housing 56 via toggle assembly 46. The toggle assembly 46 comprises a first linkage 68 extending between a connecting pin 70 on lever 36 and inner housing 56. A second linkage 72 extends from the connecting pin 70 to a reciprocal plunger assembly 74. A third linkage 76 extends from a connecting pin 78 passing through tool housing 54 to a connecting pin 80 passing through lever 36. A spring 82 extends between pin 80 and a pin 84 passing housing 54. Spring 82 acts as a return spring to return lever 36 to its normal open position as shown in FIG. 2. Each of the linkages 68, 72 and 76 are pivotably mounted at their respective ends.

When lever 36 is depressed toward housing 54, the lever 36 rotates or pivots about pin 80, which pin 80 is pivotable about pin 78 through linkage 76. This action allows pin 70 to be moved in an upward trajectory between tension setting means 48 and plunger assembly 74. As pin 70 is forced upward, the linkages 68 and 72 become aligned forcing tension setting means 48 and plunger assembly 74 apart. If the tension in cable 12 is less than the predetermined limit, e.g., 15 psi, the inner housing 56 will move, pulling arm 34 and clamping means 36 in a direction to pull slack from cable 12. Conversely, if the tension in cable 12 reaches or exceeds the predetermined limit, the housing 56 will be locked in place and result in plunger assembly 74 being actuated.

The plunger assembly 74 includes a sliding block 86 which slides within a forward tubular portion of outer or tool housing 54. A pin 88 pivotably connects linkage 72 to block 86. A spring 90, such as a plurality of Belville washers, is positioned between block 86 and an inner end 92 of nosepiece 22. The spring constant of spring 90 is greater than that of spring 82 to prevent actuation of the plunger prior to a lock-up condition of inner housing 56. A plunger 94 having a tip end 94A and an enlarged base end 94B extends between block 86 and the aperture 21. The spring 90 is clamped to about 280 psi and held on base and 94B by a C-washer 96. A pin 98 extending through an aperture 100 and mating, but smaller, apertures in the outer housing 54 limits the extent of movement of block 86 and prevents the spring 90 from collapsing the toggle assembly towards tension setting means 48.

Figure 3:
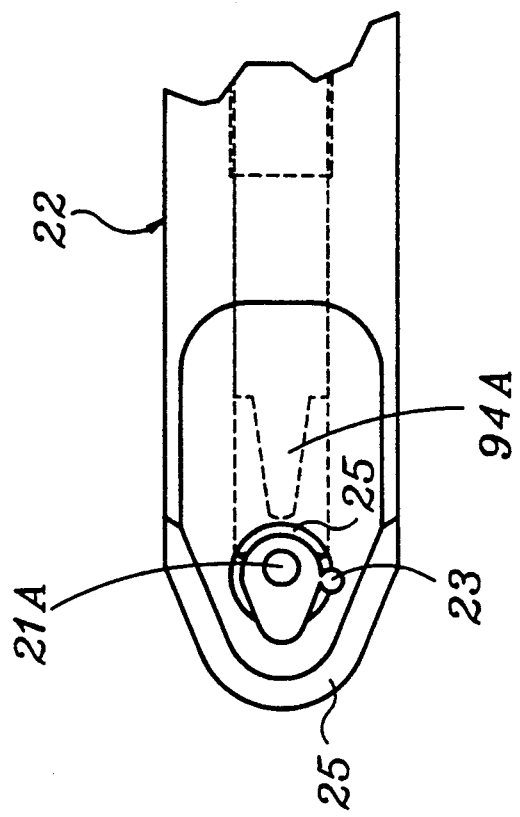
FIG. 3 is an enlarged view of the tip end of the nosepiece of the tool of FIG. 1.

As described above, a ferrule 20 fits within aperture 21 in the tip end of nosepiece 22. When the plunger assembly is actuated, the tip end 94A of plunger 94 is pushed into the aperture 21 thereby crimping the ferrule 20 about the cable 12. The aperture 21 is larger on an entrance side of the nosepiece than it is on the exit side. FIG. 3 is an enlarged view of the tip end of nosepiece 22 showing the entrance side having a large open area while the exit side has a small opening 21A just suitable for passage of cable 12. The entrance side opening has an oval configuration extending toward the tip end of nosepiece 22. Accordingly, as plunger 94 is actuated, it not only crimps ferrule 20 but drives the edge of the ferrule pass the exit side opening 21A. The ferrule edge and exit side opening edge combine to act as a shear to automatically sever the free end portion 24 of the cable 12 extending out of the ferrule 20. The tool 10 thereby pulls the cable 12 to the desired tension, crimps the ferrule and severs the free end of the cable in a single operation. An elastomer pin 23 fixed to one side of aperture 21 presses the ferrule 20 against the inner side of the aperture to prevent the ferrule from falling out of the tool if the tool is turned during operation. The areas indicated at 25 are chamfers, the chamfer surrounding aperture 21 being used to ease insertion of ferrule 20.

Figure 5:
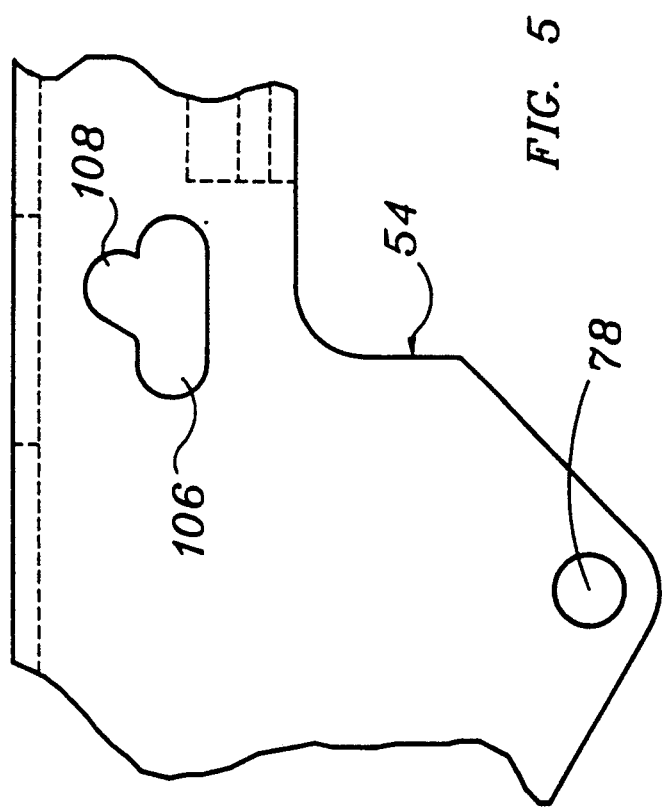
FIG. 5 is an enlarged, partial section of the tool of FIG. 1.

The mechanism for locking the inner housing 56 when the tension on cable 12 is at or greater than the predetermined limit can be appreciated by reference to FIGS. 4 and 5 in conjunction with FIG. 2. The inner housing 56 includes a first slot 102 extending lengthwise of the housing and a second slot 104 angular extending from the first slot. The outer tool housing 54 includes a first lengthwise slot 106 and a second angular slot 108 extending from slot 106. It will be appreciated that both housings 54 and 56 are tubular and that the slots extend through both sides of each housing. Furthermore, the slots 102 and 106 and the slots 104 and 108 are generally aligned. A pin 110 passes through tool 10 via slots 102, 106 and an aperture in linkage 68. Initially, the spring 82 acting through push rod 64 holds pin 110 in the forward end of the slot 102. As lever 36 is actuated, the linkage 68 pushes the pin 110 toward the aft end of the tool 10. Since the spring 82 holds the pin 110 in the forward end of slot 102, the effect is to drive the inner housing 56 backward carrying arm 34 and pulling tension on cable 12. When the tension on cable 12 reaches the predetermined limit, the spring 82 will begin to compress allowing pin 110 to move backwards in slot 102. The linkage 68 also instills an upward force on pin 110 and inclined surface 66 encourages pin 110 to move upward into slots 104 and 108. Since slots 108 are in the outer tool housing 54, the pin 110 is prevented from moving further and thereby locks inner housing 54 in place. With pin 110 fixed, upward movement of pin 70 drives the plunger assembly forward thus crimping the ferrule 20 and severing cable 12.

FIGS. 6A and 6B illustrate top and bottom views, respectively, of the inner housing 56. The bottom includes a slot 112 for entry of the linkage 68. The top has a threaded aperture 114 for connection of arm 34. The top also includes a slot 116 which is needed to allow the linkage 68 to move vertically where pin 110 slips upward into slot 104. As shown in FIG. 2, the linkage 68 has a partial cutaway at its top edge to prevent interference with the top front portion of housing 56.

While the linkage 68, 72, and 76 have been shown as single links, it is preferable that each linkage comprise a pair of space links in order to reduce twisting torque at each connecting pin. Further, while the invention has been described in what is presently considered to be a preferred embodiment, various modifications will become apparent to those skilled in the art. It is intended that the invention not be limited to the disclosed embodiment but be interpreted within the spirit and scope of the appended claims.

What is claimed is:

1. A tool for tensioning safety cable to a predetermined tension limit and for automatically terminating the cable when the predetermined limit is reached, the tool comprising:

shuttle means reciprocally mounted to the tool for incrementally advancing the cable during a drive stroke;

a toggle assembly operatively connected to said shuttle means for affecting reciprocal motion thereof;

tension setting means operatively coupled to said toggle assembly for inhibiting advancement of the cable when tension therein is greater than a preselected value;

clamping means operative in response to inhibited advancement of the cable for terminating the cable; and a deformable ferrule held in the tool, the cable passing through the ferrule to said shuttle means, said clamping means comprising means for compressing the ferrule onto the cable.

2. The tool of claim 1 and including means operative concurrently with said clamping means for severing the cable adjacent the ferrule.

3. The tool of claim 1 and including a lever pivotably mounted to the tool, said lever being operatively coupled to said toggle means for incrementally advancing said shuttle means in response to pivotable and reciprocal motion of said lever.

4. The tool of claim 1 and including an elongated nosepiece extending from an end of the tool, a distal end of said nosepiece having an aperture passing therethrough generally transverse to the elongate direction of said nosepiece for passage of the cable, an entrance side of said aperture being sufficiently large to receive said ferrule and an exit side of said aperture being sized to pass the cable while blocking said ferrule, and a plunger mounted within said nosepiece for motion transverse to said aperture, said plunger being operatively coupled to said toggle assembly for compressing said ferrule onto the cable.

5. The tool of claim 4 wherein said plunger displaces an edge of said ferrule against said exit side of said aperture for shearing the cable against said exit side of said aperture.

6. The tool of claim 4 and including a housing for containing at least said toggle assembly and said tension setting means, said toggle assembly comprising:

a first link extending between a first point on said lever and into engagement with said tension setting means;

a second link extending between said first point on said lever and into engagement with said plunger; and a third link extending between a second point on said lever and a fixed pivot point on said housing, actuation of said lever affecting a displacement of said first point for urging said first and second links towards a generally in-line position for displacing one of said shuttle means and said plunger.

7. The tool of claim 6 wherein said shuttle means comprises:

first means for grasping the cable when said shuttle means moves in a first direction to tension the cable and for sliding on the cable when said shuttle means moves in a second direction;

second means for restraining the cable when said shuttle means moves in said second direction; and actuator means coupled to said first means and said toggle assembly for moving said first means in said first direction when tension on the cable is less than said predetermined limit.

8. The tool of claim 7 wherein said actuator means comprises:

a second housing mounted for reciprocal movement with said first housing, said second housing having a first slot extending along a direction of reciprocal movement of said second housing and a second slot extending angularly from said first slot;

a first pin extending through said first slot for coupling said first link to said second housing; and a push rod coupled to said tension setting means and having an inclined planar surface abutting said first pin for urging said first pin toward said plunger within said first slot, said inclined surface urging said first pin into said second slot when said first pin is urged toward said planar surface with a force greater than said predetermined limit.

9. The tool of claim 8 and including a third slot in said first housing aligned generally with said first slot, said first pin extending into said third slot, and a fourth slot in said first housing generally aligned with said second slot for inhibiting movement of said second housing when said first pin is urged into said fourth slot.

* * * * *